United States Patent
Takada

(10) Patent No.: US 12,437,370 B2
(45) Date of Patent: Oct. 7, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yosuke Takada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

(21) Appl. No.: 17/823,004

(22) Filed: Aug. 29, 2022

(65) Prior Publication Data

US 2023/0088317 A1 Mar. 23, 2023

(30) Foreign Application Priority Data

Sep. 13, 2021 (JP) ................................ 2021-148722

(51) Int. Cl.
  *G06T 5/70* (2024.01)
  *G06T 5/40* (2006.01)
  *G06T 5/50* (2006.01)

(52) U.S. Cl.
  CPC .............. *G06T 5/70* (2024.01); *G06T 5/40* (2013.01); *G06T 5/50* (2013.01); *G06T 2207/20081* (2013.01); *G06T 2207/20084* (2013.01)

(58) Field of Classification Search
  CPC .................. G06T 5/70; G06T 2207/20081
  See application file for complete search history.

(56) References Cited

U.S. PATENT DOCUMENTS

| 11,308,592 B2* | 4/2022 | Hiasa .................. G06T 5/60 |
| 11,615,505 B2* | 3/2023 | Navarrete Michelini .................. G06T 3/4076 706/15 |
| 2013/0114897 A1* | 5/2013 | Tamura .................. H04N 23/80 382/169 |
| 2016/0239977 A1* | 8/2016 | Komatsu .................. G06T 5/80 |
| 2018/0174274 A1* | 6/2018 | Pei .................. G06T 5/10 |

(Continued)

FOREIGN PATENT DOCUMENTS

| CA | 3054383 A1 * | 8/2018 | ........... A61B 5/7203 |
| CN | 112581401 A * | 3/2021 | ........... G06K 9/6256 |

(Continued)

OTHER PUBLICATIONS

Wei K, Fu Y, Zheng Y, Yang J. Physics-based noise modeling for extreme low-light photography. IEEE Transactions on Pattern Analysis and Machine Intelligence. Aug. 10, 2021;44(11):8520-37. (Year: 2021).*

(Continued)

*Primary Examiner* — Michael Robert Cammarata
(74) *Attorney, Agent, or Firm* — Canon U.S.A., Inc. IP Division

(57) ABSTRACT

An apparatus acquires an image group including a plurality of first images, generates a plurality of second images by adding predetermined noise to each of the plurality of first images and applying a digital gain, generates learning data including respective pairs of the plurality of first images and the corresponding plurality of second images, and performs learning using a neural network and the learning data. The noise added when the plurality of second images is generated is noise reproducing a histogram containing discrete distribution decreases.

18 Claims, 11 Drawing Sheets

(56) References Cited

U.S. PATENT DOCUMENTS

| | | | | |
|---|---|---|---|---|
| 2018/0253830 | A1* | 9/2018 | Courtney | G06T 5/70 |
| 2020/0097772 | A1* | 3/2020 | Nakanishi | G06F 18/217 |
| 2020/0111198 | A1* | 4/2020 | Hiasa | G06T 3/4023 |
| 2021/0027430 | A1* | 1/2021 | Yamamoto | G06T 7/0012 |
| 2021/0042887 | A1* | 2/2021 | Yoo | G06T 5/60 |
| 2021/0211619 | A1* | 7/2021 | Mihara | G01J 4/04 |
| 2021/0272299 | A1* | 9/2021 | Yuan | G06T 3/4038 |
| 2022/0392142 | A1* | 12/2022 | Wolfe | G06T 5/70 |
| 2022/0398695 | A1* | 12/2022 | Choi | G06T 5/60 |
| 2023/0058096 | A1* | 2/2023 | Ferrés | G06T 7/40 |
| 2023/0102895 | A1* | 3/2023 | Kim | G06T 5/60 |
| | | | | 382/275 |
| 2023/0230206 | A1* | 7/2023 | Al | G06N 3/084 |
| | | | | 382/159 |
| 2023/0377195 | A1* | 11/2023 | Stember | G06T 7/0012 |
| 2024/0179421 | A1* | 5/2024 | Zhu | H04N 23/71 |
| 2024/0354911 | A1* | 10/2024 | Wuelker | G06V 10/82 |

FOREIGN PATENT DOCUMENTS

| | | | | |
|---|---|---|---|---|
| JP | 2020052513 | A | 4/2020 | |
| JP | 2020197915 | A * | 12/2020 | G06N 3/04 |
| WO | WO-2019235019 | A1 * | 12/2019 | G01J 4/04 |
| WO | WO-2023007956 | A1 * | 2/2023 | G06V 10/771 |
| WO | WO-2023007958 | A1 * | 2/2023 | G06V 10/774 |

OTHER PUBLICATIONS

K. Mourya, S. Patil, T. Nadaf, D. Voccaligara, H. Chari and S. Aswale, "Techniques for Learning to See in the Dark: A Survey," 2020 International Conference on Emerging Trends in Information Technology and Engineering (ic-ETITE), Vellore, India, 2020, pp. 1-7, doi: 10.1109/ic-ETITE47903.2020.60 (Year: 2020).*

W. Wang, X. Chen, C. Yang, X. Li, X. Hu and T. Yue, "Enhancing Low Light Videos by Exploring High Sensitivity Camera Noise," 2019 IEEE/CVF International Conference on Computer Vision (ICCV), Seoul, Korea (South), 2019, pp. 4110-4118, doi: 10.1109/ICCV.2019.00421. (Year: 2019).*

R. S. Thakur, S. Chatterjee, R. N. Yadav and L. Gupta, "Image De-Noising With Machine Learning: A Review," in IEEE Access, vol. 9, pp. 93338-93363, 2021, doi: 10.1109/ACCESS.2021.3092425. (Year: 2021).*

D. Dussault and P. Hoess, "Noise performance comparison of ICCD with CCD and EMCCD cameras," in Proc. SPIE—The Int. Soc. Opt. Eng., 2004, vol. 5563, pp. 195-204. (Year: 2004).*

B. Moseley, et al, "Extreme Low-Light Environment-Driven Image Denoising over Permanently Shadowed Lunar Regions with a Physical Noise Model," 2021 IEEE/CVF Conference on Computer Vision and Pattern Recognition (CVPR), Nashville, TN, USA, 2021, pp. 6313-6323, doi: 10.1109/CVPR46437.2021.00625. (Year: 2021).*

Marked-up machine translation of Kobayshi WO 2023007956 A1 (Year: 2023).*

* cited by examiner

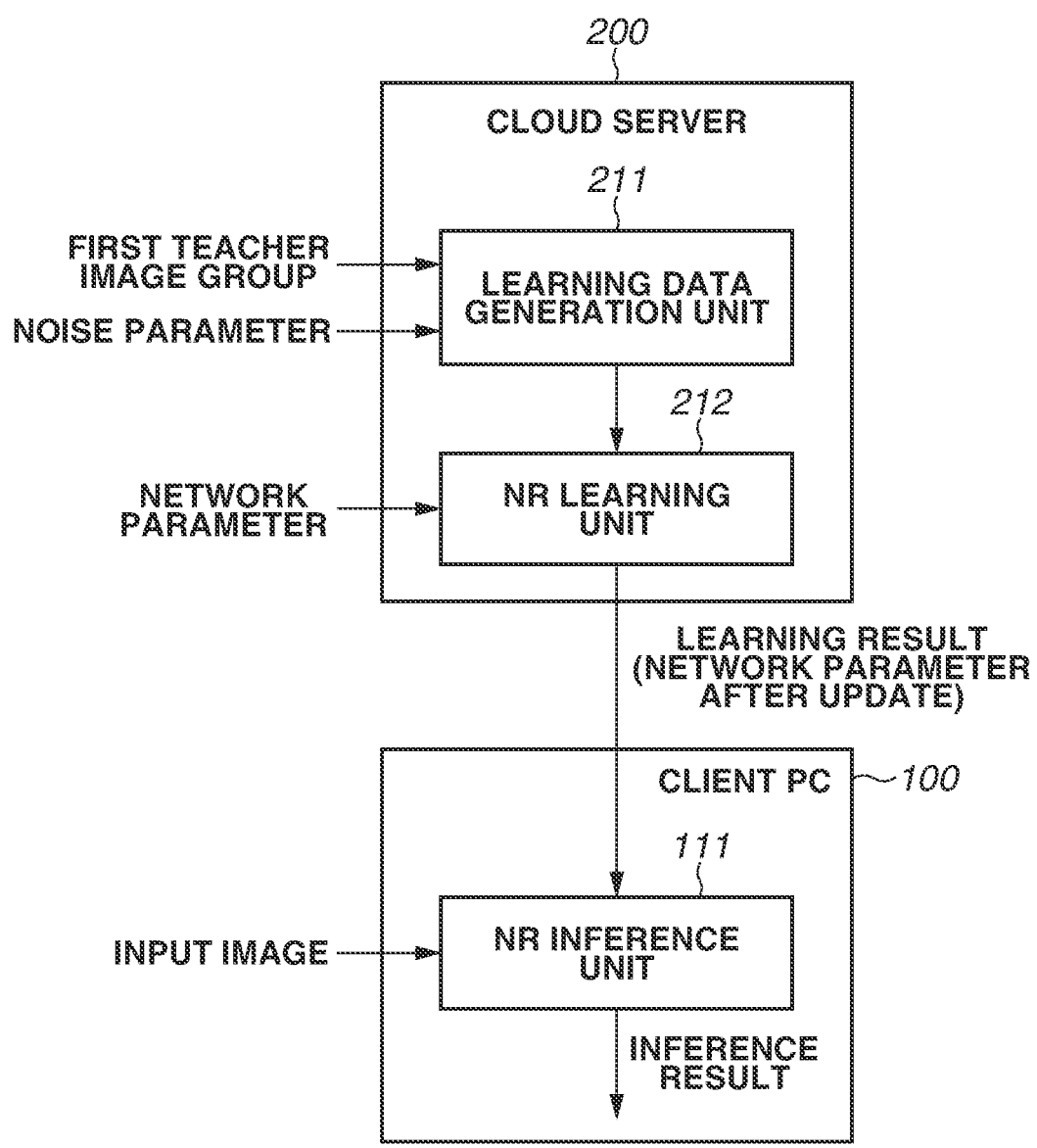

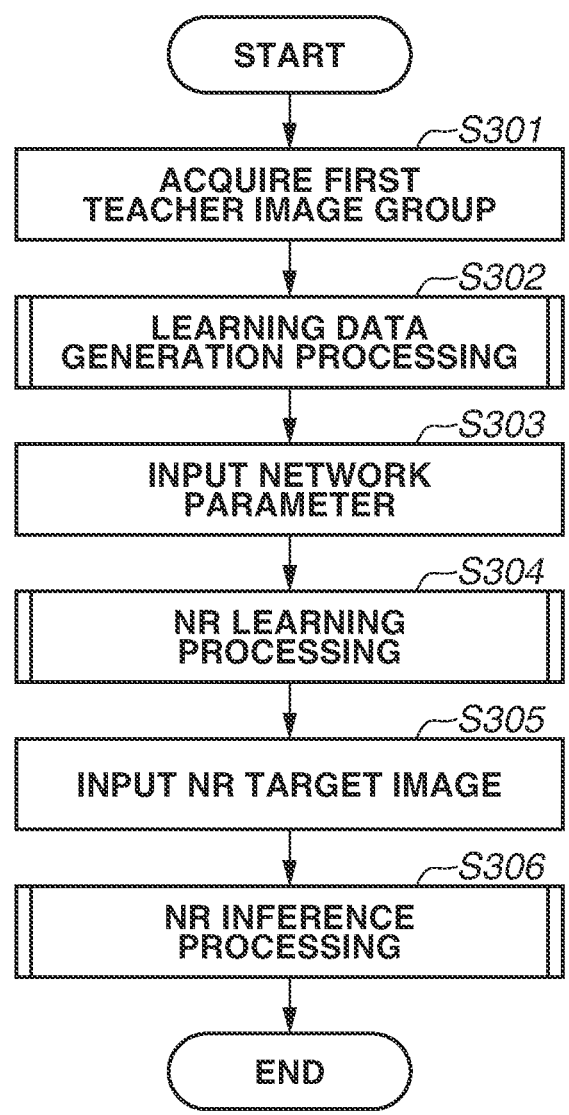

FIG.4A
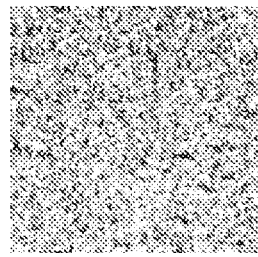
400
FIG.4B
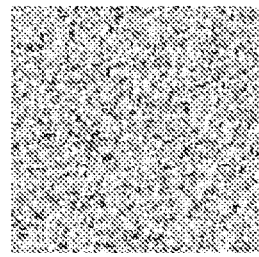
401
FIG.4C
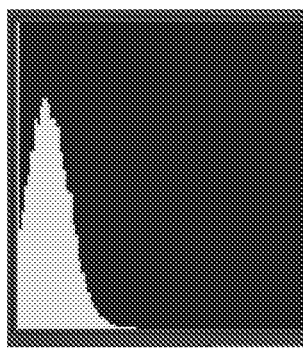
410
FIG.4D
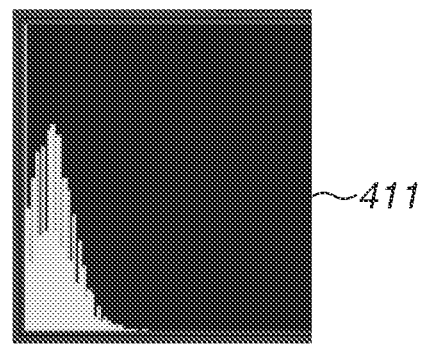
411
FIG.4E
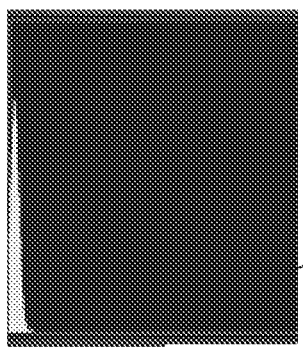
420
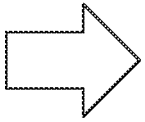
DIGITAL GAIN
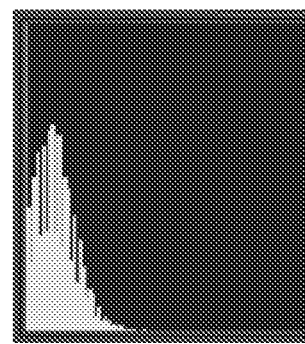
421

INFORMATION PROCESSING APPARATUS, INFORMATION PROCESSING METHOD, AND STORAGE MEDIUM

BACKGROUND DISCLOSURE

Technical Field Disclosure

The aspect of the embodiments relates to an image noise reduction technique using machine learning.

Description of the Related Art

When a picture or a moving image is captured, granular noise may spread over the entire image so as to cover the scenery that otherwise would appear. Such noise not only impairs the image quality but also, for example, reduces the visibility of a subject in the case of using a monitoring camera and reduces recognition accuracy in the case of using an object recognition camera such as a robot eye camera. For this reason, noise reduction using digital processing is often performed after the capturing of the picture or the moving image.

Many rule-based techniques, in which developers design the algorithms in details, have been developed as methods for the noise reduction processing so far, but, in recent years, a deep learning technique, which has contributed to considerable performance improvement in the object recognition field and the object detection field, has also started to be applied to the noise reduction processing. In a case where the noise reduction processing is implemented by applying the deep learning technique thereto, a large number of pieces of learning data each including a pair of a noise-free image as a first teacher image and a noise-containing image as a second teacher image are prepared. Then, a network parameter of a neural network for reducing the noise amount contained in the second teacher images is learned based on these pairs of first and second teacher images. At the time of the learning, differences are acquired on a pixel-by-pixel basis between the pairs of first and second teacher images, and thus the subject position is to be substantially the same in both the first and second teacher images.

For this reason, collecting the learning data using image capturing alone takes enormous time and effort.

On the other hand, Japanese Patent Application Laid-Open No. 2020-52513 discusses a method that prepares the first teacher images and generates the second teacher images by adding noise to the first teacher images.

In a case where the neural network is caused to learn using the learning data generated using the method discussed in Japanese Patent Application Laid-Open No. 2020-52513, it is difficult to acquire a network parameter capable of having an excellent noise reduction effect on an image captured with ultrahigh sensitivity under a low-illuminance environment such as a starlit environment or an environment darker than the starlit environment. In other words, the network parameter acquired based on the method discussed in Japanese Patent Application Laid-Open No. 2020-52513 does not have an excellent noise reduction effect on the image captured with ultrahigh sensitivity.

SUMMARY DISCLOSURE

According to an aspect of the embodiments, an apparatus includes an acquisition unit configured to acquire an image group including a plurality of first images, a generation unit configured to generate a plurality of second images by adding noise to each of the plurality of first images and applying a digital gain, the noise reproducing a histogram containing discrete distribution decreases, and generate learning data including respective pairs of the plurality of first images and the corresponding plurality of second images, and a learning unit configured to perform learning using a neural network and the learning data.

Further features of the disclosure will become apparent from the following description of exemplary embodiments with reference to the attached drawings.

BRIEF DESCRIPTION OF THE DRAWINGS

FIG. 2 is a block diagram illustrating an overall functional configuration of the information processing system according to the first exemplary embodiment.

FIG. 3 is a flowchart illustrating a procedure of information processing according to the first exemplary embodiment.

FIGS. 4A to 4E are diagrams illustrating a difference in noise characteristic between an analog gain and a digital gain.

DESCRIPTION OF THE EMBODIMENTS

Figure 1:
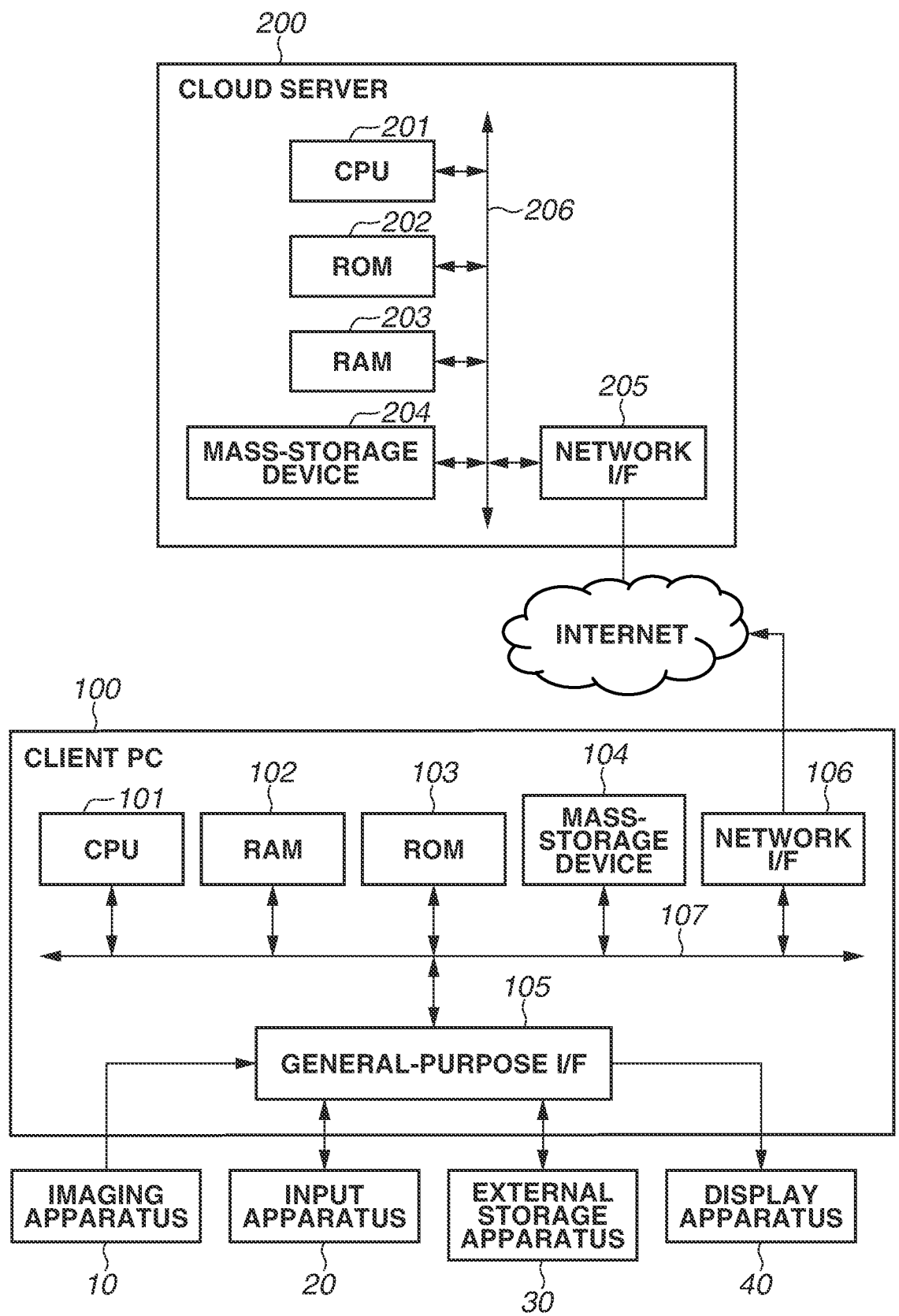
FIG. 1 is a block diagram illustrating an example of a configuration of an information processing system including information processing apparatuses according to a first exemplary embodiment.

Exemplary embodiments will be described below with reference to the drawings. The exemplary embodiments described below are not intended to limit the disclosure, and not all combinations of features described in the present exemplary embodiments are essential to the solving means of the disclosure. The configurations according to the exemplary embodiments can be modified or changed as appropriate based on the specifications of an apparatus to which any of the exemplary embodiments is applied and various kinds of conditions (e.g., use condition, use environment). Further, parts of the exemplary embodiments described below may be combined as appropriate. In the following exemplary embodiments, the same components will be denoted by the same reference numerals.

<Convolutional Neural Network>

First, a description will be given of a convolutional neural network (CNN) generally used in information processing techniques applying deep learning which is used in the exemplary embodiments to be described below. The CNN is a technique of repeating non-linear calculation after convoluting a filter generated by learning, on image data. The filter is also called a local receptive field (LRF). Image data acquired by performing the non-linear calculation after convoluting the filter on the image data is called a feature map. The learning is performed using a plurality of pieces of learning data each including a pair of input image data and output image data. Simply speaking, the learning refers to generating the value of the filter capable of achieving highly accurate conversion from the input image data to the corresponding output image data based on the learning data. Details thereof will be described below.

In a case where the image data has red, green, and blue (RGB) channels or the feature map includes a plurality of pieces of image data, the filter used in the convolution also has a plurality of channels accordingly. More specifically, the convolution filter is expressed in a four-dimensional array in which the number of channels is added besides the height and width sizes and the number of filters. The processing for performing the non-linear calculation after convoluting the filter on the image data (or the feature map) is expressed in the unit of layer, and is expressed as, for example, a feature map of the n-th layer or a filter of the n-th layer. For example, in a case where a CNN includes repeating the convolution of the filter and the non-linear calculation three times, such a CNN has a three-layered network structure. Such non-linear calculation processing can be formulized as indicated by the following equation (1).

$$X_n^{(l)} = f\left(\sum_{n=1}^{N} W_n^{(l)} * X_{n-1}^{(l)} + b_n^{(l)}\right) \quad (1)$$

In the equation (1), $W_n$ represents the filter of the n-th layer, $b_n$ represents a bias of the n-th layer, f represents a non-linear operator, $X_n$ represents the feature map of the n-th layer, and * represents a convolution operator. Further, (l) indicates the l-th filter or feature map. The filter and the bias are generated by the learning to be described below, and are also collectively called a "network parameter". For example, a sigmoid function or a rectified linear unit (ReLU) is used for the non-linear calculation. In the case of the ReLU, the non-linear calculation is provided as indicated by the following equation (2).

$$f(X) = \begin{cases} X & \text{if } 0 \leq X \\ 0 & \text{otherwise} \end{cases} \quad (2)$$

As indicated in the equation (2), a negative element among elements of an input vector X is calculated to be zero, whereas a positive element among the elements remains unchanged.

ResNet in the image recognition field and RED-Net as an application thereof in the super resolution field are famous as the networks using the CNN. Both of the networks achieve highly accurate processing by using multiple layers in the CNN and repeating the filter convolution multiple times. For example, ResNet is characterized by a network structure including a short cut route for the convolution layers, thereby implementing a multi-layered network including as many as 152 layers and thus achieving highly accurate recognition close to the human recognition rate.

Highly accurate processing can be achieved by the multi-layered CNN because, simply speaking, a non-linear relationship between the input and the output can be expressed by repeating the non-linear calculation multiple times.

<Learning Using CNN>

Next, the learning using the CNN will be described. The learning using the CNN is performed by minimizing an objective function generally expressed by the following equation (3) with respect to the learning data including a pair of input learning image data (a second teacher image) and output learning image data (a first teacher image) corresponding thereto.

$$L(\theta) = \frac{1}{n}\sum_{i=1}^{n} \|F(X_i; \theta) - Y_i\|_2^2 \quad (3)$$

In the equation (3), L represents a loss function that measures an error between a correct answer and an estimation thereof. $Y_i$ represents the i-th output learning image data, and $X_i$ represents the i-th input learning image data. F represents a function collectively expressing the calculation (using the equation 1) made at each layer of the CNN. The variable θ represents the network parameter (the filter and the bias). $\|Z\|_2$ represents an L2 norm and is, simply speaking, a square root of a sum of squares of elements in a vector Z. The variable n represents the total number of pieces of learning image data used in the learning. Generally, the total number of pieces of learning image data is large, and thus a part of the learning image data is randomly selected and used in the learning in stochastic gradient descent (SGD). This enables reduction of calculation loads on the learning using the large number of pieces of learning image data. Further, various methods such as a momentum method, an adaptive gradient algorithm (AdaGrad) method, an adaptive learning rate (AdaDelta) method, and an adaptive moment estimation (Adam) method are known as the method for minimizing (optimizing) the objective function. The Adam method is provided as indicated by the following equation (4).

$$g = \frac{\partial L}{\partial \theta_i^t}$$

$$m = \beta_1 m + (1 - \beta_1)g$$

$$v = \beta_2 v + (1 - \beta_2)g^2$$

$$\theta_i^{t+1} = \theta_i^t - \alpha \frac{\sqrt{1-\beta_2^t}}{(1-\beta_1)} \frac{m}{(\sqrt{v} + \varepsilon)} \quad (4)$$

In the equation (4), $\theta_i^t$ represents the i-th network parameter at the t-th iteration, and g represents a gradient of the loss function L with respect to $\theta_i^t$. The variables m and v represent moment vectors, a represents a base learning rate, $\beta_1$ and $\beta_2$ represent hyper parameters, and F represents a small constant. There is no policy for selecting the optimization method in the learning, and thus any method may be used basically, but it is known that the learning time varies because the convergence differs from method to method.

In a first exemplary embodiment, a method that generates the second teacher images by adding predetermined noise considering a rounding error to the first teacher images, and performs the learning using the first and second teacher images will be described.

FIG. 1 illustrates an example of a configuration of an information processing system according to the present exemplary embodiment. As illustrated in FIG. 1, the information processing system includes a cloud server 200, which is in charge of learning data generation and noise reduction (NR) learning processing (hereinafter referred to as NR learning or NR learning processing), and a client personal computer (PC) 100, which is in charge of noise reduction inference processing (hereinafter referred to as NR inference or NR inference processing). The cloud server 200 and the client PC 100 are assumed to be connected to each other via the Internet.

<Hardware Configuration of Client PC>

The client PC 100 according to the present exemplary embodiment is an information processing apparatus that performs the NR inference using the learned network parameter provided from the cloud server 200 and a RAW image (with a Bayer array) input from an imaging apparatus 10 as an input image to be processed. In the present exemplary embodiment, the client PC 100 implements noise reduction processing on the RAW image by executing a pre-installed information processing application program using the neural network provided from the cloud server 200. The client PC 100 includes a central processing unit (CPU) 101, a random access memory (RAM) 102, a read only memory (ROM) 103, a mass-storage device 104, a general-purpose interface (I/F) 105, and a network I/F 106, and these components are connected to each other via a system bus 107. The client PC 100 is also connected to the imaging apparatus 10, an input apparatus 20, an external storage apparatus 30, and a display apparatus 40 via the general-purpose I/F 105.

The CPU 101 executes a program stored in the ROM 103 using the RAM 102 as a work memory, thereby comprehensively controlling the components of the client PC 100 via the system bus 107. The mass-storage device 104 is, for example, a hard disk drive (HDD) or a solid-state drive (SSD), and stores various kinds of data used by the client PC 100. The CPU 101 writes data to the mass-storage device 104 and reads out data stored in the mass-storage device 104, via the system bus 107. The general-purpose I/F 105 is, for example, a serial bus interface such as a Universal Serial Bus (USB) interface, an Institute of Electrical and Electronics Engineers (IEEE) 1394 interface, and a High-Definition Multimedia Interface (HDMI)®. The client PC 100 acquires data from the external storage apparatus 30 (a recording medium such as a memory card, a CompactFlash (CF) card, a Secure Digital (SD) card, or a USB memory) via the general-purpose I/F 105. Further, the client PC 100 receives a user's instruction from the input apparatus 20 such as a mouse or a keyboard via the general-purpose I/F 105. Further, the client PC 100 outputs, for example, image data processed by the CPU 101 to the display apparatus 40 (an image display device such as a liquid-crystal display) via the general-purpose I/F 105. Further, the client PC 100 acquires data of the captured image (the RAW image) as a target of the noise reduction processing from the imaging apparatus 10 via the general-purpose I/F 105. The network I/F 106 is an interface for connecting to the Internet. The client PC 100 accesses the cloud server 200 using an installed web browser to acquire the network parameter for the NR inference.

<Hardware Configuration of Cloud Server>

The cloud server 200 according to the present exemplary embodiment is an information processing apparatus that provides the cloud service on the Internet. More specifically, the cloud server 200 generates the learning data and performs the NR learning, and provides the network parameter as a result of the learning in response to a request from the client PC 100. The cloud server 200 includes a CPU 201, a ROM 202, a RAM 203, a mass-storage device 204, and a network I/F 205, and these components are connected to each other via a system bus 206. The CPU 201 controls the overall operation by reading out a control program stored in the ROM 202 to perform various kinds of processing. The RAM 203 is used as a temporarily storage area such as a main memory or a work area of the CPU 201. The mass-storage device 204 is a large-capacity secondary storage device such as an HDD or an SSD that stores image data and various kinds of programs. The network I/F 205 is an interface for connecting to the Internet, and provides the above-described network parameter in response to the request from the web browser in the client PC 100.

The client PC 100 and the cloud server 200 include components other than the above-described components, but the descriptions thereof will be omitted. In the present exemplary embodiment, it is assumed to generate the learning data to perform the NR learning in the cloud server 200 and download the network parameter resulting from the learning into the client PC 100 to perform the NR inference on the RAW image as the processing target (a development target). However, this system configuration is merely an example, and the information processing system is not limited thereto. For example, the information processing system may be configured in such a manner that the functions assigned to the cloud server 200 are subdivided, and the learning data generation and the NR learning are performed by different apparatuses. Further alternatively, the information processing system may be configured in such a manner that the learning data generation, the demosaicing learning, and the demosaicing inference are all performed by the imaging apparatus 10 having both the functions of the client PC 100 and the functions of the cloud server 200.

<Procedure of Overall Processing in System>

Next, various kinds of processing performed in the information processing system according to the present exemplary embodiment will be described.

FIG. 2 is an overall functional block diagram of the information processing system. FIG. 3 is a flowchart illustrating a procedure of processing in the information processing system. As illustrated in FIG. 2, the client PC 100 includes an NR inference unit 111. The cloud server 200 includes a learning data generation unit 211 and an NR learning unit 212. Each of the functional units illustrated in FIG. 2 is implemented by the CPU 101 or the CPU 201 executing a computer program corresponding to the functional unit. Alternatively, all or a part of the functional units illustrated in FIG. 2 may be implemented by hardware. The operation of the information processing system will be described with reference to the flowchart illustrated in FIG. 3. In the following description of the flowchart, an alphabet "S" will indicate a processing step.

In step S301, data of a first teacher image group prepared in advance is input to the cloud server 200. Each of first teacher images is a RAW image having the Bayer array, and can be acquired by, for example, being captured by the imaging apparatus 10. Generally, various kinds of images such as a picture of a nature such as a scenery or an animal, a picture of a human such as a portrait or a sports picture, and a picture of an artificial object such as a building or a product are used as the first teacher images. Further, as the first teacher images, images acquired by being captured by the imaging apparatus 10 may be directly uploaded, or images captured and collected in advance may be stored in the HDD or the like and then may be uploaded. The data of the first teacher image group input to the cloud server 200 is transmitted to the learning data generation unit 211.

In step S302, the learning data generation unit 211 generates a second teacher image group based on the first teacher image group input in step S301 and a noise parameter to be described below, and generates learning data including respective pairs of the images of the first teacher image group and the corresponding images of the second teacher image group. Details of the learning data generation processing and the noise parameter will be described below.

In step S303, the above-described network parameter to be applied to the CNN in the NR learning is input to the cloud server 200. The input network parameter is transmitted to the NR learning unit 212.

In step S304, the NR learning unit 212 initializes the weight of the CNN using the received network parameter, and then causes the CNN to learn using the learning data generated in step S302.

Details of the NR learning will be described below.

In step S305, the RAW image having the Bayer array as the NR processing target is input to the client PC 100. As the RAW image, for example, an image captured by the imaging apparatus 10 may be input directly, or an image captured in advance and stored in the mass-storage device 104 may be read out. Along with the RAW image, an imaging parameter, such as International Organization Standards (ISO) sensitivity in capturing the RAW image, is also input to the client PC 100. The data of the input RAW image is transmitted to the NR inference unit 111.

In step S306, the NR inference unit 111 builds the same CNN as that used in the learning by the NR learning unit 212, and performs the NR inference processing on the input RAW image as the processing target. At this time, the existing network parameter is initialized with the updated network parameter received from the cloud server 200. The NR inference unit 111 inputs the input RAW image as the processing target to the CNN to which the updated network parameter is applied, and performs the NR inference processing using the same method as that used by the NR learning unit 212 to acquire an inference result.

The above is the description of the procedure of the overall processing in the information processing system according to the present exemplary embodiment. While the learning data is generated in step S302 in the flowchart of FIG. 3, the learning data may be generated later. More specifically, the information processing system may be configured to generate the corresponding second teacher image during the subsequent NR learning processing (during processing for calculating an error between the first teacher image and the second teacher image with noise added thereto).

<Learning Data Generation Processing>

The above-described learning data generation processing in step S302 will be described.

In the present exemplary embodiment, the second teacher image group is generated based on the input first teacher image group and the noise parameter, and the learning data including respective pairs of the images of the first teacher image group and the corresponding images of the second teacher image group is generated. Details of the noise parameter will be described below. Each of the second teacher images is generated by adding predetermined noise based on the noise parameter to the corresponding first teacher image. At this time, in the present exemplary embodiment, each of the second teacher images is generated so as to reproduce a rounding error due to a digital gain.

The reason why the rounding error is to be reproduced will be described.

As discussed in Japanese Patent Application Laid-Open No. 2020-52513, the second teacher image is generated by adding noise similar to desired noise to be reduced (hereinafter referred to as target noise) to the first teacher image. If the noise in an actually captured image as the first teacher image and the noise in the second teacher image exhibit similar dispersion at this time, a network parameter capable of achieving desired noise reduction can be acquired by deep learning. However, for example, in a case where an image is captured with high sensitivity under an ultralow-illuminance environment such as a starlit environment or an environment darker than the starlit environment, a difference in noise characteristic (shape) occurs even when the noise dispersion is similar between the actually captured image and the second teacher image. This is due to a difference in how a gain is applied in the imaging apparatus at the time of high-sensitivity imaging. There are two types of gains, an analog gain and a digital gain, and the former serves to amplify charge during conversion of exposed light into charge by an image sensor, and the latter serves to amplify a pixel value using software calculation after the analog-to-digital (A/D) conversion. Generally, the digital gain is applied after the analog gain is applied.

FIGS. 4A to 4E illustrate a difference between the noise in the second teacher image and the noise in the actually captured image in a case where the digital gain is not taken into consideration. FIG. 4A illustrates an example of a second teacher image 400 generated by adding the target noise to the first teacher image that is free from noise and is entirely in gray. On the other hand, FIG. 4B illustrates an example of an actually captured image 401. The noise dispersion is similar but the shape of the luminance histogram is different between the second teacher image 400 and the actually captured image 401. FIG. 4C illustrates a luminance histogram 410 of the second teacher image 400, and FIG. 4D illustrates a luminance histogram 411 of the actually captured image 401. As seen therefrom, because a rounding error due to the digital gain occurs in the actually captured image 401, the luminance histogram 411 contains discrete distribution decreases (i.e., comb distribution or a tone loss). As described above, even when the noise dispersion is similar between the second teacher image 400 and the actually captured image 401, the shape of the luminance histogram is different and thus the noise characteristic is also different between the second teacher image 400 and the actually captured image 401.

FIG. 4E illustrates a difference in the luminance histogram between the analog gain and the digital gain. A histogram 420 and a histogram 421 in FIG. 4E are a luminance histogram after the application of the analog gain and a luminance histogram after the application of the digital gain, respectively. Normally, in a lower illuminance environment, the digital gain is applied more strongly, and thus the noise contained in the second teacher image 400 has a different characteristic from the noise contained in the actually captured image 401. For this reason, even when the noise dispersion similar to that in the actually captured image 401 is learned, an artifact occurs after the noise reduction because of the difference in noise characteristic.

To ensure consistency in the above-described noise characteristic, in the present exemplary embodiment, the information processing system is configured to cause the CNN to learn not only the noise dispersion but also the noise characteristic in the actually captured image by producing a rounding error and then generating the second teacher image by adding the noise containing the rounding error to the first teacher image. This enables the information processing system to suppress the occurrence of an artifact when performing the NR inference using the network parameter acquired after the learning. The above is the description of the reason for reproducing the rounding error.

Figure 5:
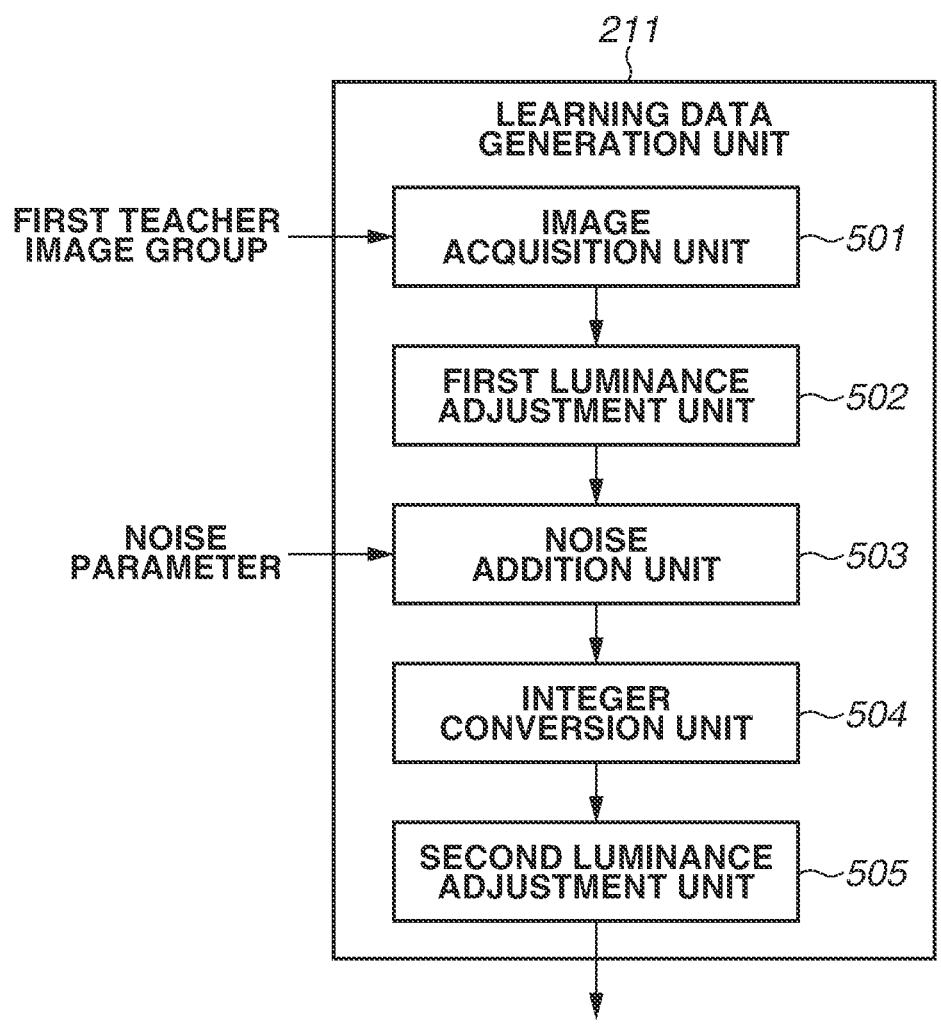
FIG. 5 is a diagram illustrating an internal configuration of a learning data generation unit.

FIG. 5 is a functional block diagram illustrating an internal configuration of the learning data generation unit 211 according to the present exemplary embodiment. As illustrated in FIG. 5, the learning data generation unit 211 includes an image acquisition unit 501, a first luminance adjustment unit 502, a noise addition unit 503, an integer conversion unit 504, and a second luminance adjustment unit 505.

Figure 6:
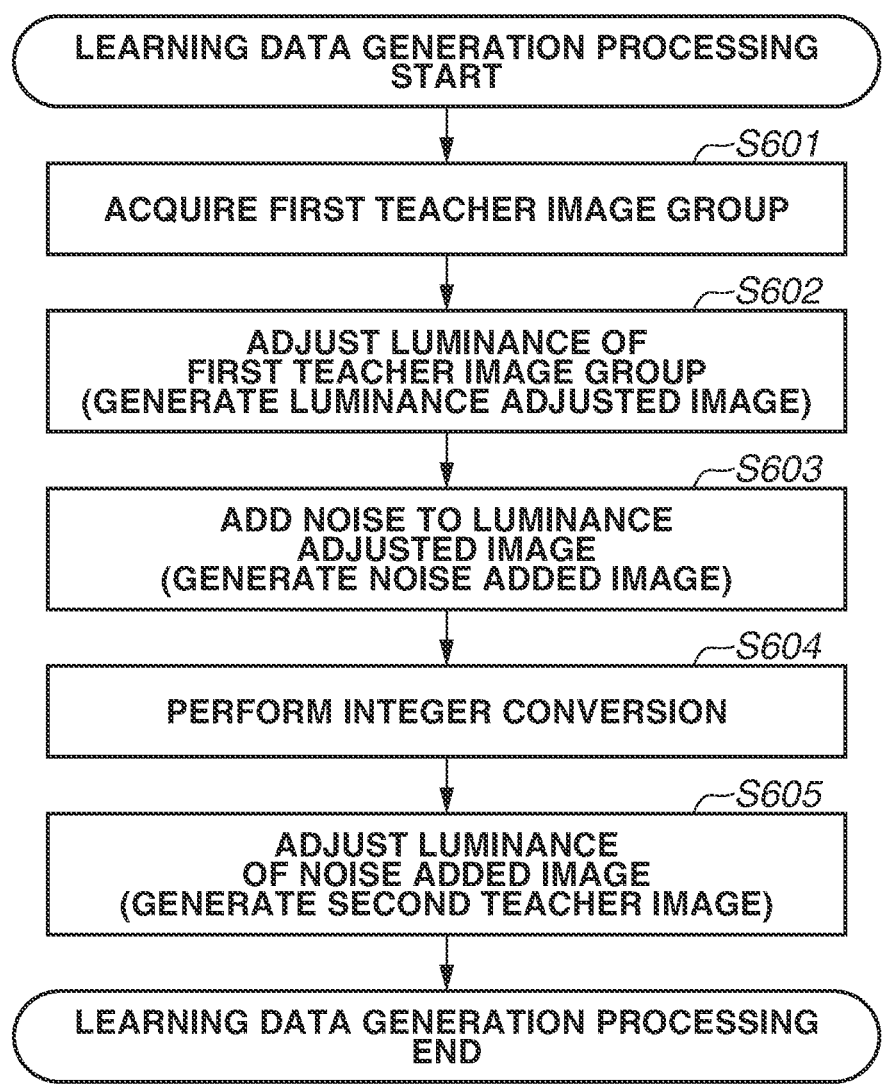
FIG. 6 is a flowchart illustrating details of learning data generation processing.
Figure 7:
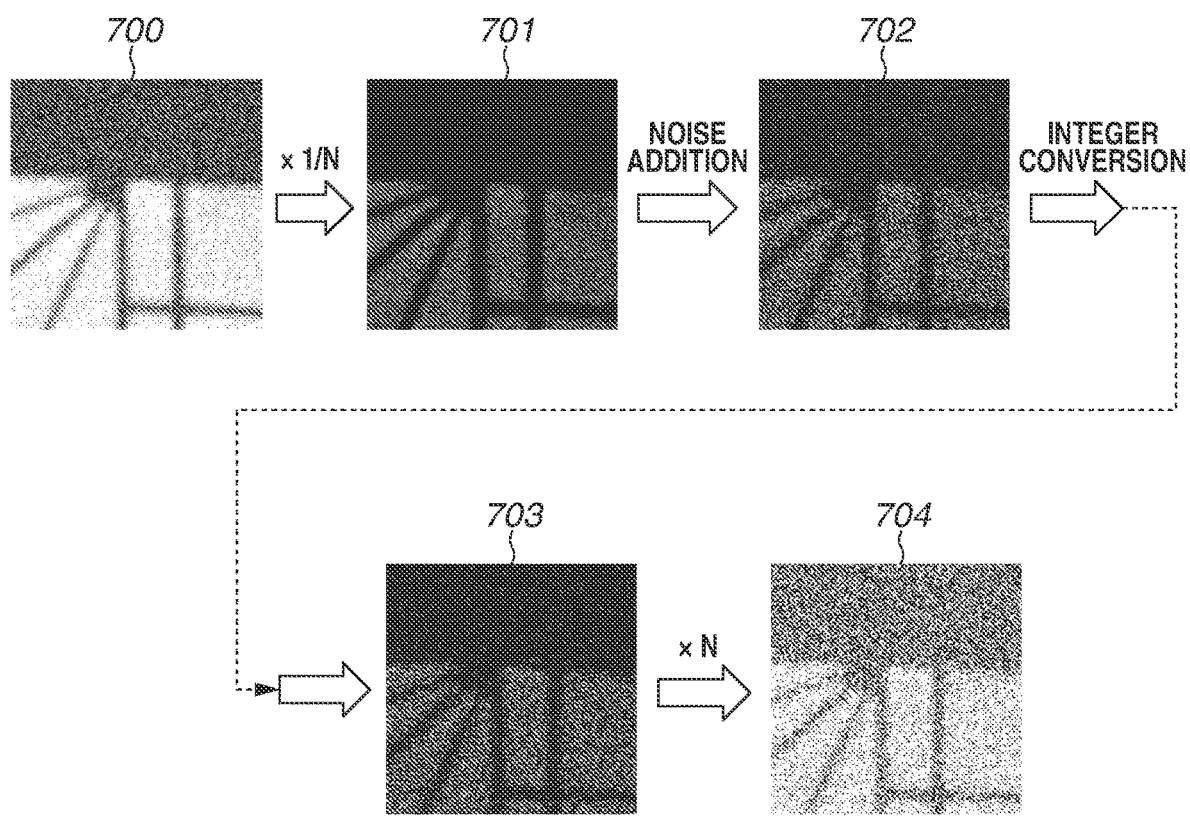
FIG. 7 is a diagram illustrating an example of a result of the learning data generation processing.

FIG. 6 is a flowchart illustrating details of the learning data generation processing performed by the learning data generation unit 211. FIG. 7 illustrates an example of an image acquired in each processing step of the learning data generation processing according to the present exemplary embodiment. In the following description, the operation of the learning data generation unit 211 will be described with reference to the flowchart in FIG. 6 and the image example in FIG. 7.

In step S601, the image acquisition unit 501 acquires one first teacher image from the first teacher image group. A first teacher image 700 in FIG. 7 indicates an example of the first teacher image acquired by the image acquisition unit 501. The processing on one first teacher image will be described, but similar processing is performed on all the first teacher images included in the first teacher image group subsequently.

In step S602, the first luminance adjustment unit 502 adjusts the luminance range of the first teacher image 700. A luminance adjusted image 701 in FIG. 7 indicates an example of an image acquired after the luminance range of the first teacher image 700 is adjusted. The first luminance adjustment unit 502 adjusts the brightness of the first teacher image 700 so as to be lower than the original brightness. More specifically, the first luminance adjustment unit 502 outputs the luminance adjusted image 701 by applying a gain of 1/N (a real number satisfying N>1) times to each pixel so as to narrow the entire luminance range of the first teacher image 700. The luminance range is narrowed at this time in order to add noise that reproduces the luminance histogram containing discrete distribution decreases by applying the digital gain as described above.

Figure 8:
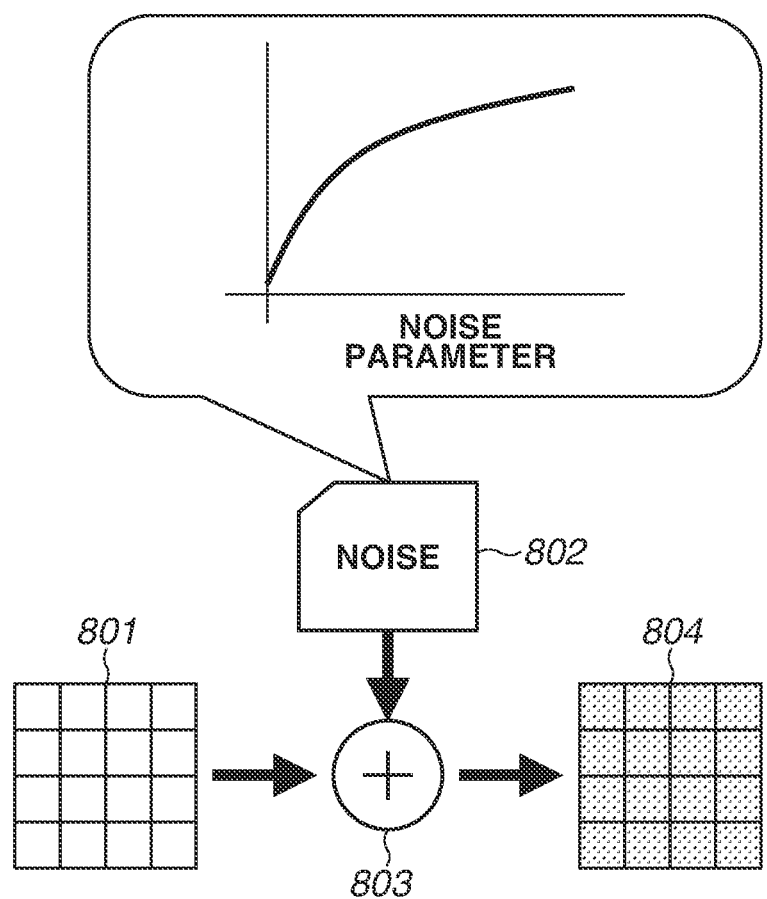
FIG. 8 is a diagram illustrating noise addition.

In step S603, the noise addition unit 503 acquires the noise parameter illustrated in FIG. 8 and adds the noise to the luminance adjusted image 701 based the acquired noise parameter. A noise added image 702 in FIG. 7 indicates an example of an image acquired after the noise is added to the luminance adjusted image 701. The noise parameter expresses the noise depending on the luminance measured in advance for each sensitivity, using an approximate expression.

FIG. 8 illustrates an example of the noise parameter. In the noise parameter in FIG. 8, the horizontal axis and the vertical axis represent the luminance and the noise dispersion, respectively, and the noise dispersion increases as the luminance increases. In other words, in the noise parameter, the dispersion is determined depending on the luminance values of the pixels. The noise addition unit 503 makes an addition 803 of noise 802 based on the luminance values of all the pixels, to a luminance adjusted image 801 according to the noise parameter. An image thus acquired is a noise added image 804. The luminance adjusted image 801 in FIG. 8 indicates the luminance adjusted image 701 in FIG. 7 in a simplified manner, and the noise added image 804 in FIG. 8 indicates the noise added image 702 in FIG. 7 in a simplified manner.

In step S604, the integer conversion unit 504 produces the rounding error by performing an integer conversion (an analog-to-digital (A/D) conversion) of the noise added image 702. A noise added image 703 in FIG. 7 indicates an example of an image acquired after the rounding error is produced by the integer conversion of the noise added image 702. The resolution at the time of the integer conversion may be approximately 8 bits, but is changed based on the shape of the luminance histogram corresponding to the target noise. The degree of discrete distribution decreases in the luminance histogram increases as the resolution reduces, and, conversely, the degree of discrete distribution decreases in the luminance histogram reduces as the resolution increases.

In step S605, the second luminance adjustment unit 505 adjusts the luminance range of the noise added image 703 acquired after the integer conversion. An image thus acquired is the second teacher image. The second luminance adjustment unit 505 adjusts the brightness of the noise added image 703 acquired after the integer conversion, so as to approximately match the brightness of the first teacher image. More specifically, to increase the entire luminance range of the noise added image 703 acquired after the integer conversion, the second luminance adjustment unit 505 adjusts the luminance range of the noise added image 703 by applying a gain of N times to each pixel so that the luminance range approximately matches the luminance range of the first teacher image acquired in step S601 (so that the brightness approximately matches that of the first teacher image). An image 704 in FIG. 7 indicates an example of an image acquired after the gain of N times is applied to each pixel in the noise added image 703 acquired after the integer conversion.

The above is the description of the learning data generation processing according to the present exemplary embodiment.

<NR Learning Processing>

Figure 9:
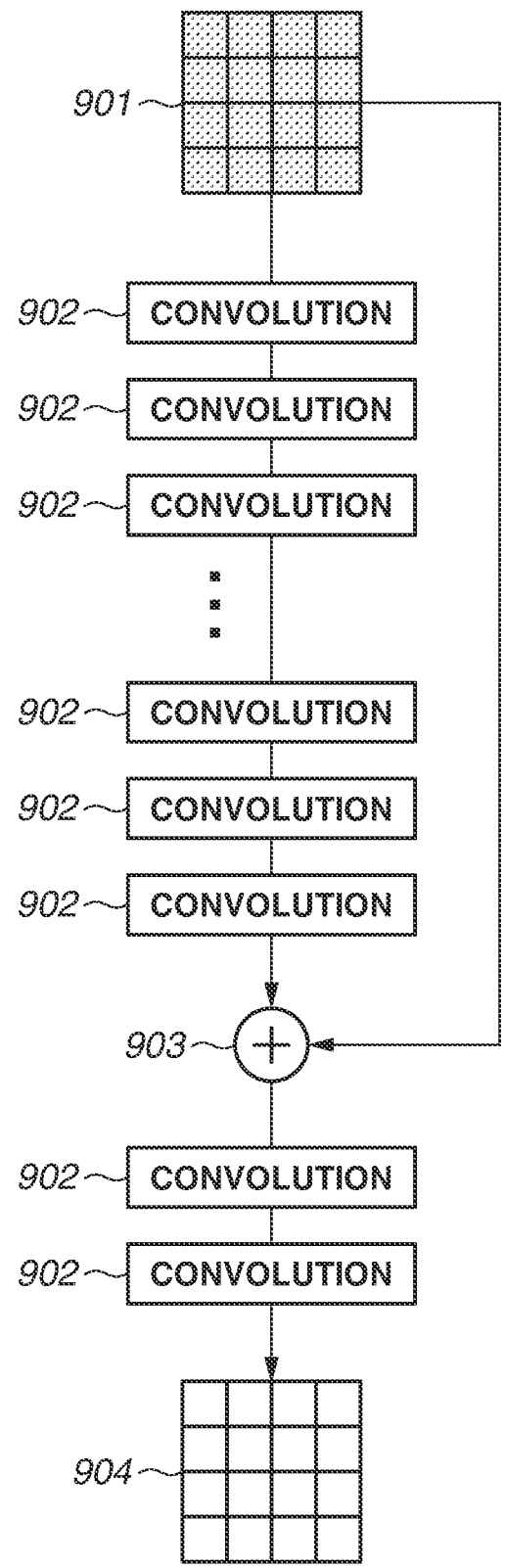
FIG. 9 is a diagram illustrating a structure of a convolutional neural network (CNN) and a learning procedure.

The NR learning by the NR learning unit 212 will be described. The CNN is used in the NR learning. FIG. 9 illustrates a structure of the CNN and a procedure of the learning. In the following description, the NR learning will be described in detail with reference to FIG. 9.

The CNN includes a plurality of filters 902 that performs the calculation using the above-described equation (1). The NR learning unit 212 inputs a second teacher image 901 to the CNN. The NR learning unit 212 sequentially applies the filters 902 to the second teacher image 901, thereby calculating feature maps (not illustrated). The NR learning unit 212 then connects the calculated feature maps and the second teacher image 901 in a channel direction via a connection layer 903. If the number of channels of the feature maps and the number of channels of the second teacher image 901 are n1 and n2, respectively, the number of channels in the connection result is n1+n2. The NR learning unit 212 sequentially applies the filters 902 to this connection result, and produces an output corresponding to the number of channels same as the number of channels of the second teacher image 901 at the last filter. As a result, an inference result 904 can be acquired. Then, the NR learning unit 212 acquires the loss function value by calculating differences between the acquired inference result 904 and the first teacher image (not illustrated) and calculating an average thereof in the entire image. Lastly, the NR learning unit 212 updates the network parameter using the back propagation method or the like using the acquired loss function value.

The above is the description of the NR learning processing according to the present exemplary embodiment.

While in the present exemplary embodiment, the learning is performed in a non-learning state using the data of the first teacher image group prepared in advance, the processing according to the present exemplary embodiment may be performed based on an already learned network parameter. Further, while the example where the luminance range is adjusted has been described in the present exemplary embodiment, anything other than the luminance range may be adjusted as long as the brightness of the image can be adjusted. For example, R, G, and B pixel values, or a value V after conversion from RGB to hue, saturation, and value (HSV) color space may be used as an index indicating the brightness of the image. Further, while in the present exemplary embodiment, the RAW image captured through the color filter having the Bayer array has been described as an example, the color filter may have any other array than the Bayer array. Further, the data format of the image is not limited to the RAW image, and may be, for example, a demosaiced RGB image or an image after YUV conversion. Further, while the entire luminance range of the image is adjusted using the linear calculation assuming that the RAW image has a linear characteristic in the present exemplary embodiment, for example, an image to which non-linear processing such as gamma correction is applied may be subjected to the processing according to the present exemplary embodiment after being subjected to processing for canceling out the non-liner processing. Alternatively, if the processing for canceling out the non-linear processing is not performed, the gain N for the adjustment of the luminance range may be multiplied by $\gamma$ (e.g., $\gamma=1/2.2$).

In the first exemplary embodiment described above, the configuration in which the network parameter capable of reducing the noise in the image captured with ultrahigh sensitivity to which the digital gain is strongly applied is acquired by adding the noise considering the rounding error to the first teacher images to generate the second teacher images and performing the learning using the first and second teacher images. In a second exemplary embodiment, a description will be given of a configuration in which learning specialized for each of sensitivity with the analog gain applied and sensitivity with the digital gain applied in addition to the analog gain is performed, and the network parameter to be used in the inference processing is switched based on whether the digital gain is applied. In the present exemplary embodiment, the descriptions of the parts similar to those in the first exemplary embodiment, such as the basic configuration of the information processing system, will be omitted and a difference from the first exemplary embodiment will be mainly described.

Figure 10:
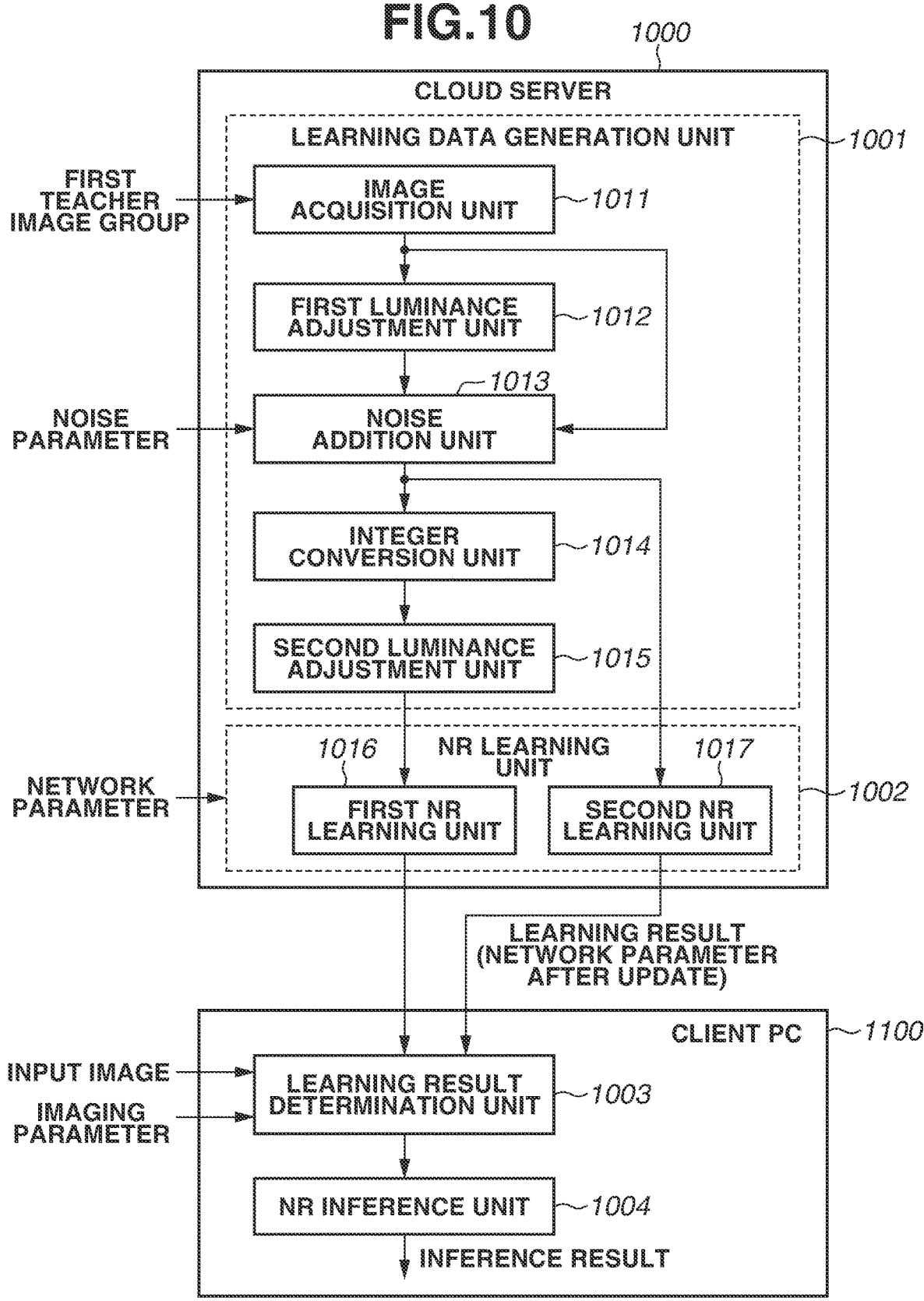
FIG. 10 is a block diagram illustrating an overall functional configuration of an information processing system according to a second exemplary embodiment.

FIG. 10 is a block diagram illustrating a functional configuration of an information processing system according to the present exemplary embodiment. As illustrated in FIG. 10, a cloud server 1000 includes a learning data generation unit 1001 and an NR learning unit 1002. The learning data generation unit 1001 includes an image acquisition unit 1011, a first luminance adjustment unit 1012, a noise addition unit 1013, an integer conversion unit 1014, and a second luminance adjustment unit 1015. The NR learning unit 1002 includes a first NR learning unit 1016 and a second NR learning unit 1017.

Figure 11:
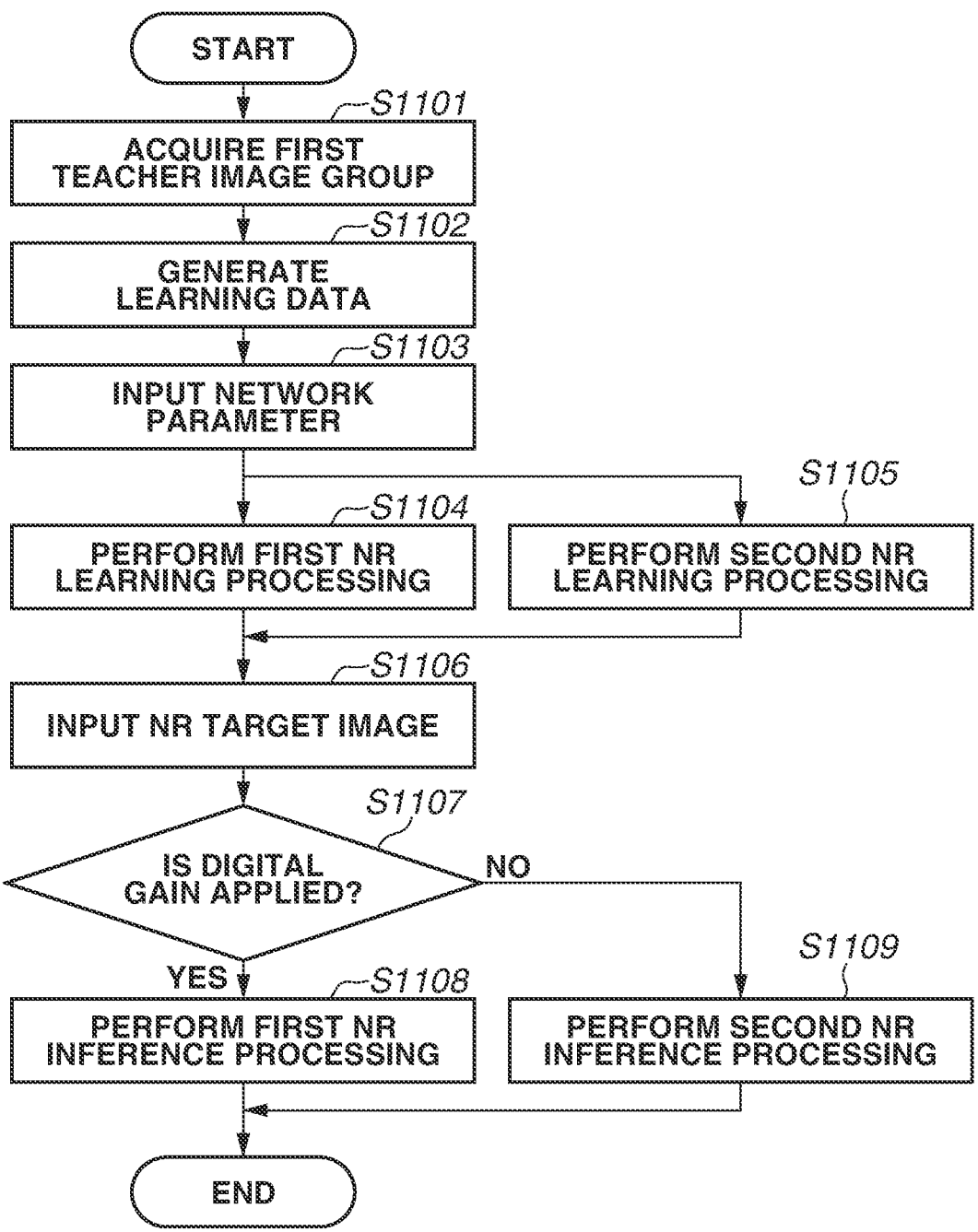
FIG. 11 is a flowchart illustrating a procedure of information processing according to the second exemplary embodiment.

FIG. 11 is a flowchart illustrating a procedure of processing in the information processing system according to the present exemplary embodiment. The operation of the information processing system illustrated in FIG. 10 will be described with reference to the flowchart in FIG. 11.

In step S1101, the data of the first teacher image group prepared in advance is input to the cloud server 1000 and is transmitted to the learning data generation unit 1001, similarly to the above-described processing in step S301 in FIG. 3.

In step S1102, the learning data generation unit 1001 generates the learning data based on the first teacher image group input in step S1101. The difference from the first exemplary embodiment will be now described. In the present exemplary embodiment, the image acquisition unit 1011 acquires one first teacher image from the first teacher image group and determines whether to apply the digital gain. In the present exemplary embodiment, a half of the images of the first teacher image group are used for the analog gain and the remaining half of the images are used for the digital gain. In the case of applying the digital gain, the learning data generation unit 1001 performs similar processing to the processing (in steps S602 to S605) according to the first exemplary embodiment, and uses the generated learning data as the learning data for the digital gain. In the case of not applying the digital gain, the learning data generation unit 1001 generates the second teacher image by skipping the processing in steps S602 and S604 and making the noise addition in step S603, and uses the generated learning data as the learning data for the analog gain.

In step S1103, the network parameters to be applied to a CNN for first NR learning and a CNN for second NR learning are input to the cloud server 1000. The input network parameters are transmitted to the first NR learning unit 1016 and the second NR learning unit 1017 in the NR learning unit 1002. More specifically, the network parameter to be applied to the CNN for the first NR learning is transmitted to the first NR learning unit 1016, and the network parameter to be applied to the CNN for the second NR learning is transmitted to the second NR learning unit 1017.

In step S1104, the first NR learning unit 1016 initializes the weight of the CNN using the received network parameter, and then causes the CNN to learn using the learning data for the digital gain that is generated in step S1102. The network parameter for the digital gain acquired by the learning is transmitted to the client PC 1100. The learning method is similar to the above-described processing in step S304 in FIG. 3.

In step S1105, the second NR learning unit 1017 initializes the weight of the CNN using the received network parameter, and then causes the CNN to learn using the learning data for the analog gain that is generated in step S1102. The network parameter for the analog gain acquired by the learning is transmitted to the client PC 1100. The learning method is similar to that used in the above-described processing in step S304 in FIG. 3.

In step S1106, the RAW image having the Bayer array as the NR processing target and the learned network parameter, which are input to the client PC 1100, are transmitted to a learning result determination unit 1003. The imaging parameter, such as the ISO sensitivity in capturing the RAW image, is also transmitted to the learning result determination unit 1003 along therewith.

In step S1107, the learning result determination unit 1003 refers to the imaging parameter to determine whether the digital gain is applied to the transmitted RAW image. If the learning result determination unit 1003 determines that the digital gain is applied (YES in step S1107), the processing proceeds to step S1108. If the digital gain is not applied (NO in step S1107), the processing proceeds to step S1109.

In step S1108, the first NR learning unit 1017 builds the same CNN as that used in the learning by the first NR learning unit 1016, and performs the first NR inference processing on the input RAW image by using the updated network parameter received from the cloud server 1000.

In step S1109, the NR inference unit 1004 builds the same CNN as that used in the learning by the second NR learning unit 1017, and performs the second NR inference processing on the input RAW image by using the updated network parameter received from the cloud server 1000.

Eventually, an inference result acquired in step S1108 or S1109 is output.

The above is the description of the procedure of the overall processing in the information processing system according to the present exemplary embodiment.

As described above, each of the information processing systems according to the first and second exemplary embodiments generates the second teacher images by adding the noise considering the rounding error to the first teacher images, and causes the neural network to learn using the first and second teacher images. This enables the information processing system to acquire the network parameter capable of having an excellent noise reduction effect on the image captured with ultrahigh sensitivity. In other words, according to the first and second exemplary embodiments, it is possible to suppress the noise in the image captured with ultrahigh sensitivity without causing an artifact in the image.

An exemplary embodiment of the disclosure can also be implemented by processing that supplies a program for implementing one or more functions according to the above-described exemplary embodiments to a system or an apparatus via a network or a storage medium, and causes one or more processors in a computer of the system or the apparatus to read out and execute the program. Further, an exemplary embodiment of the disclosure can also be implemented by a circuit (e.g., an application specific integrated circuit (ASIC)) for implementing one or more functions according to the above-described exemplary embodiments.

Each of the above-described exemplary embodiments merely indicates an example of how to embody the disclosure when implementing the disclosure, and the technical scope of the disclosure shall not be construed limitedly by the exemplary embodiments.

The exemplary embodiments of the disclosure can be implemented in various manners without departing from the technical idea thereof or the main features thereof.

According to the exemplary embodiments of the disclosure, it is possible to exert an excellent noise reduction effect on the image captured with ultrahigh sensitivity.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-148722, filed Sep. 13, 2021, which is hereby incorporated by reference herein in its entirety.

What is claimed is:

1. An apparatus comprising:
at least one processor; and
a memory coupled to the at least one processor, the memory having instructions that, when executed by the processor, causes the at least one processor to function as:
an acquisition unit configured to acquire an image group including a plurality of first images;
an adjustment unit configured to adjust luminance range of each of the plurality of first images by applying a gain to each pixel as to narrow the luminance range in order to add noise;
a generation unit configured to generate a plurality of second images by adding the noise to each of the plurality of first images and applying a digital gain, the noise reproducing a histogram containing discrete distribution decreases, and generate learning data including respective pairs of the plurality of first images and the corresponding plurality of second images; and
a learning unit configured to perform learning using a neural network and the learning data,
wherein the generation unit includes:
a first adjustment unit configured to generate a plurality of luminance adjusted images by adjusting brightness of each of the plurality of first images,
an addition unit configured to generate a plurality of noise added images by adding the noise to each of the plurality of first images or each of the plurality of luminance adjusted images,
a conversion unit configured to perform integer conversion of each of the plurality of noise added images, and
a second adjustment unit configured to generate the plurality of second images by adjusting brightness of each of the plurality of noise added images subjected to the integer conversion,
wherein the learning unit includes:
a first learning unit configured to perform first learning using respective pairs of the plurality of first images and a corresponding plurality of second images that is generated by adjusting the brightness of each of the plurality of first images and adding the noise to each of the plurality of first images, as learning data, and
a second learning unit configured to perform second learning using respective pairs of the plurality of first images and a corresponding plurality of second images that is generated by adding the noise to each of the plurality of first images without adjusting the brightness of each of the plurality of first images, as learning data, and wherein the first learning unit performs the first learning using the learning data including the generated plurality of second images.

2. The apparatus according to claim 1, wherein the first adjustment unit adjusts the brightness of each of the plurality of first images so as to be lower than brightness before the adjusting.

3. The apparatus according to claim 1, wherein the second adjustment unit adjusts the brightness of each of the plurality of noise added images so as to approximately match the brightness of the corresponding first image.

4. The apparatus according to claim 1, wherein the noise has dispersion determined depending on a luminance value of each pixel.

5. The apparatus according to claim 1, wherein the brightness of each of the plurality of first images is calculated based on one of luminance, a value, and a pixel value of each of the plurality of first images.

6. The apparatus according to claim 1, wherein the at least one processor further functions as an inference unit configured to perform noise reduction by performing inference processing on an input image as a processing target using a neural network acquired by the learning.

7. The apparatus according to claim 1, wherein the at least one processor further functions as:
a first unit configured to perform noise reduction by performing first inference processing using a first neural network acquired by the first learning;
a second unit configured to perform noise reduction by performing second inference processing using a second neural network acquired by the second learning; and
a determination unit configured to switch whether to use the first unit or the second unit, based on a parameter in capturing an input image as a processing target.

8. The apparatus according to claim 7, wherein the determination unit determines whether a digital gain is applied to the input image, and the first inference processing is performed in a case where the digital gain is applied to the input image and the second inference processing is performed in a case where the digital gain is not applied to the input image.

9. A processing apparatus comprising:
at least one processor; and
a memory coupled to the at least one processor, the memory having instructions that, when executed by the processor, causes the at least one processor to function as:
an acquisition unit configured to acquire a neural network acquired by the learning performed by the apparatus according to claim 1; and
an inference unit configured to perform noise reduction by performing inference processing on an input image as a processing target using the acquired neural network.

10. A processing apparatus comprising:
at least one processor; and
a memory coupled to the at least one processor, the memory having
instructions that, when executed by the processor, causes the at least one processor to function as: an acquisition unit configured to acquire neural networks acquired by the first learning and the second learning performed by the apparatus according to claim 1;
a first unit configured to perform noise reduction by performing first inference processing using the neural network acquired by the first learning;
a second unit configured to perform second inference processing using the neural network acquired by the second learning; and
a determination unit configured to switch whether to use the first unit or the second unit, based on a parameter in capturing an input image as a processing target.

11. A method performed by an apparatus, the method comprising:
acquiring an image group including a plurality of first images;
adjusting luminance range of each of the plurality of first images by applying a gain to each pixel as to narrow the luminance range in order to add noise;
generating a plurality of second images by adding the noise to each of the plurality of first images and applying a digital gain, the noise reproducing a histogram containing discrete distribution decreases, and generating learning data including respective pairs of the plurality of first images and the corresponding plurality of second images; and
performing learning using a neural network and the learning data,
wherein the generation unit includes:
a first adjustment unit configured to generate a plurality of luminance adjusted images by adjusting brightness of each of the plurality of first images,
an addition unit configured to generate a plurality of noise added images by adding the noise to each of the plurality of first images or each of the plurality of luminance adjusted images,
a conversion unit configured to perform integer conversion of each of the plurality of noise added images, and
a second adjustment unit configured to generate the plurality of second images by adjusting brightness of each of the plurality of noise added images subjected to the integer conversion,
wherein the learning unit includes:
a first learning unit configured to perform first learning using respective pairs of the plurality of first images and a corresponding plurality of second images that is generated by adjusting the brightness of each of the plurality of first images and adding the noise to each of the plurality of first images, as learning data, and
a second learning unit configured to perform second learning using respective pairs of the plurality of first images and a corresponding plurality of second images that is generated by adding the noise to each of the plurality of first images without adjusting the brightness of each of the plurality of first images, as learning data, and
wherein the first learning unit performs the first learning using the learning data including the generated plurality of second images.

12. The method according to claim 11, wherein the generating includes:
generating a plurality of luminance adjusted images by adjusting brightness of each of the plurality of first images,
generating a plurality of noise added images by adding the noise to each of the plurality of first images or each of the plurality of luminance adjusted images,
performing integer conversion of each of the plurality of noise added images, and
generating the plurality of second images by adjusting brightness of each of the plurality of noise added images subjected to the integer conversion.

13. The method according to claim 11, wherein the noise has dispersion determined depending on a luminance value of each pixel.

14. The method according to claim 11, further comprising performing noise reduction by performing inference processing on an input image as a processing target using a neural network acquired by the learning.

15. A non-transitory computer-readable storage medium storing instructions that, when executed by a computer, cause the computer to perform a method comprising:
acquiring an image group including a plurality of first images;
adjusting luminance range of each of the plurality of first images by applying a gain to each pixel as to narrow the luminance range in order to add noise;
generating a plurality of second images by adding the noise to each of the plurality of first images and applying a digital gain, the noise reproducing a histogram containing discrete distribution decreases, and generating learning data including respective pairs of the plurality of first images and the corresponding plurality of second images; and
performing learning using a neural network and the learning data,
wherein the generation unit includes:
a first adjustment unit configured to generate a plurality of luminance adjusted images by adjusting brightness of each of the plurality of first images,
an addition unit configured to generate a plurality of noise added images by adding the noise to each of the plurality of first images or each of the plurality of luminance adjusted images,
a conversion unit configured to perform integer conversion of each of the plurality of noise added images, and
a second adjustment unit configured to generate the plurality of second images by adjusting brightness of each of the plurality of noise added images subjected to the integer conversion,
wherein the learning unit includes:
a first learning unit configured to perform first learning using respective pairs of the plurality of first images and a corresponding plurality of second images that is generated by adjusting the brightness of each of the plurality of first images and adding the noise to each of the plurality of first images, as learning data, and
a second learning unit configured to perform second learning using respective pairs of the plurality of first images and a corresponding plurality of second images that is generated by adding the noise to each of the plurality of first images without adjusting the brightness of each of the plurality of first images, as learning data, and
wherein the first learning unit performs the first learning using the learning data including the generated plurality of second images.

16. The non-transitory computer-readable storage medium according to claim 15, wherein the generating includes:
generating a plurality of luminance adjusted images by adjusting brightness of each of the plurality of first images,
generating a plurality of noise added images by adding the noise to each of the plurality of first images or each of the plurality of luminance adjusted images,
performing integer conversion of each of the plurality of noise added images, and
generating the plurality of second images by adjusting brightness of each of the plurality of noise added images subjected to the integer conversion.

17. The non-transitory computer-readable storage medium according to claim 15, wherein the noise has dispersion determined depending on a luminance value of each pixel.

18. The non-transitory computer-readable storage medium according to claim 15, further comprising performing noise reduction by performing inference processing on an input image as a processing target using a neural network acquired by the learning.

* * * * *